May 29, 1928.

A. PUGLISI 1,671,840

CUSHION ENVELOPE FILLING MACHINE

Filed April 5, 1927

Inventor
A. Puglisi.
By
Attorney

Patented May 29, 1928.

1,671,840

UNITED STATES PATENT OFFICE.

ANGELO PUGLISI, OF NEW YORK, N. Y.

CUSHION-ENVELOPE-FILLING MACHINE.

Application filed April 5, 1927. Serial No. 181,160.

This invention relates to a machine for filling casings or envelopes of cushions with down, and has for one of its objects to provide a machine of this character through the medium of which the casings or envelopes may be filled easily and quickly and without loss of down and which shall be simple and durable and capable of being operated at a small cost.

Figure 1:
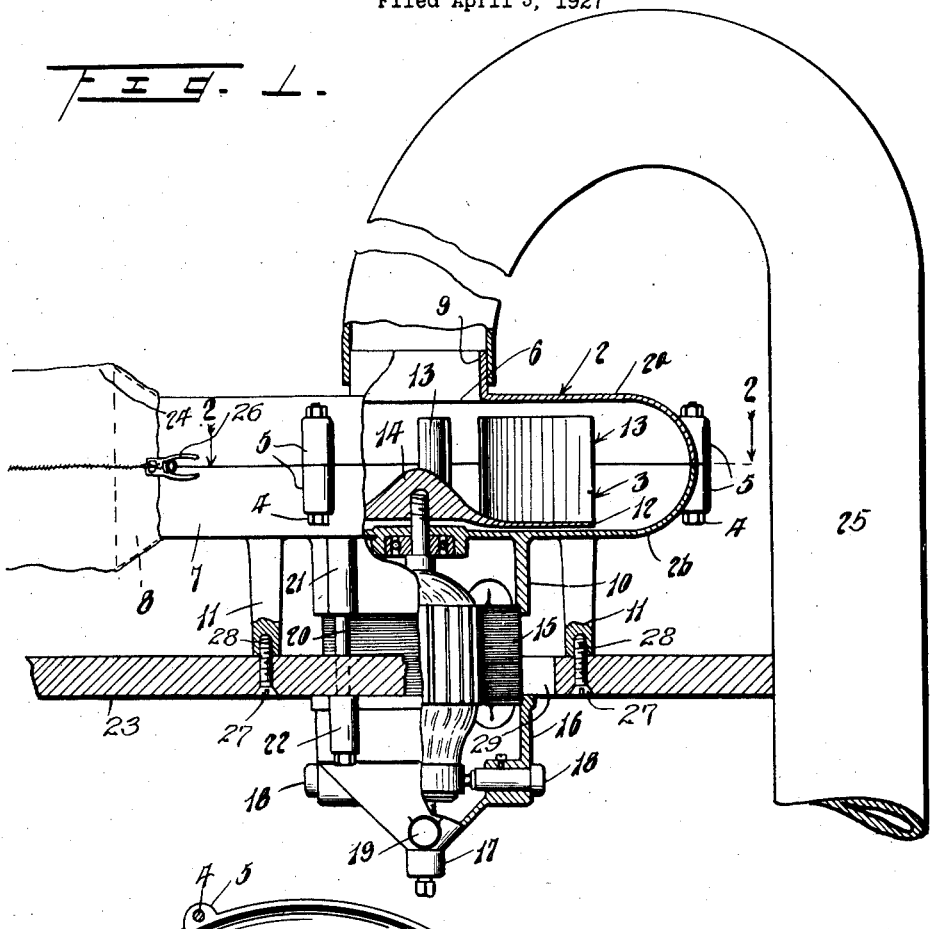
Figure 2:
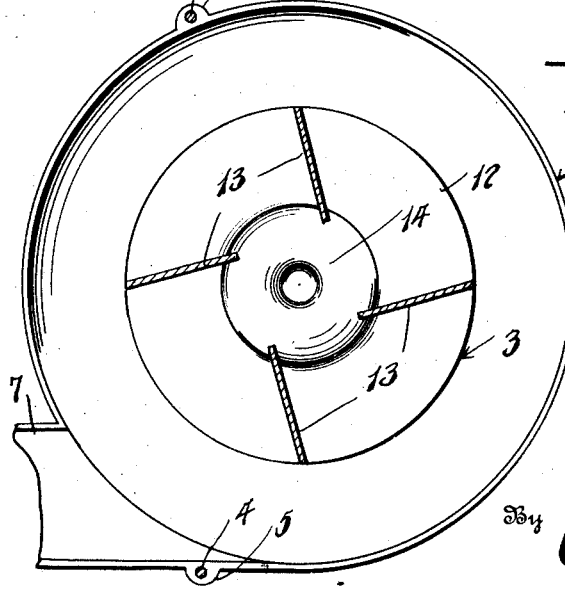

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a view partly in plan and partly in horizontal section of the machine, and Figure 2 is a sectional view taken on the vertical plane indicated by the line 2—2 of Figure 1.

The machine comprises a blower which consists of a casing 2 and an impeller 3. The casing 2 is of sectional formation, and the sections 2ª and 2ᵇ thereof are similar and secured together by bolts 4 passing through bosses 5 carried by the casing sections. The casing 2 is provided with an intake port 6 which is formed in the casing section 2ª, and with a discharge spout 7 which is provided with a flared outer end 8 and is of sectional formation. One section of the discharge spout 7 is formed on the casing section 2ª and the other on the casing section 2ᵇ. The casing section 2ª is provided with an outwardly extending collar 9 which surrounds the intake port 6. The casing section 2ᵇ is provided with a downwardly directed cylindrical flange 10 the purpose of which will be presently set forth, and with legs 11 which are adapted to support the blower in a horizontal position.

The impeller 3 comprises a disk 12 and blades 13. The blades extend axially from the disk 12, and are arranged at an angle of sixty degrees to the radius or axis thereof. The disk 12 is provided with a conical central portion 14 which extends therefrom in the direction of the extension of the blades 13.

The impeller 3 is rotated through the medium of an electric motor of the universal type. The stator 15 of the motor has one end thereof positioned in the flange 10. The impeller 3 is fixed to the armature or rotor shaft of the motor. A cap 16 is applied to the outer end of the stator 15, and is provided with a bearing 17 for the rotor or armature shaft of the motor. The cap 16 carries the motor brushes 18, and is provided with a grease cup 19. The motor is secured in place on the casing 2 by bolts 20 which engage bosses 21 on the flange 10 and bosses 22 on the cap 16.

In practice, the machine is supported by the legs 11 upon a table 23 with the blower in a horizontal position and spaced sufficiently above the table to permit a casing or envelope 24 to rest upon the table and be connected to the spout 7, a flexible tube or hose 25 which is connected at one end to the collar 9 has its other end positioned in the supply bag which is located near the table, and thereafter the motor is set in operation. The impeller 3 draws the down from the supply bag and forces it into the casing or envelope, filling the casing or envelope 24 in a comparatively short time and without loss of down. The casing or envelope 24 is closed except for a small opening for the reception of the discharge spout 7 and the flared end 8 of the latter, it being held on the spout by two clips 26 which are adapted to prevent the enlargement of the spout receiving opening thereof. The casing or envelope 24 becomes taut immediately after the machine is in operation, and grips against the outer sides of the spout end 8 in a manner to prevent its becoming casually enlarged and to prevent the down from blowing out during the filling operation. The casing 2 is fixed to the table 23 by screws 27 which pass through the table and enter screw threaded sockets 28 in the lower ends of the legs 11, and the table is provided with an opening 29 for the reception of the motor which extends below the legs.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A machine for filling cushion envelopes, comprising a blower, means for supporting the blower in a horizontal position upon a table, the blower being provided in its top side with an intake and at its lateral side with a discharge spout, said means being adapted to support the blower above the table so as to permit the envelope to be filled to be placed on the table alongside the blower and connected to the discharge spout, and a flexible tube communicating with the intake of the blower and extending therefrom to a point beyond the table.

2. A machine for filling cushion envelopes, comprising a blower provided in its top side with an intake and at its lateral side with a discharge spout, legs connected to the bottom side of the blower and provided in their lower ends with screw threaded sockets, and a flexible tube connected to the top side of the blower and communicating with the intake thereof.

In testimony whereof I affix my signature.

ANGELO PUGLISI.